US009489595B2

(12) United States Patent
Shen et al.

(10) Patent No.: US 9,489,595 B2
(45) Date of Patent: Nov. 8, 2016

(54) METHOD, APPARATUS, AND DEVICE FOR DETECTING CONVEX POLYGON IMAGE BLOCK

(71) Applicant: Huawei Technologies Co., Ltd., Shenzhen, Guangdong (CN)

(72) Inventors: Yanhao Shen, Hangzhou (CN); Jiong Zhou, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 84 days.

(21) Appl. No.: 14/572,210

(22) Filed: Dec. 16, 2014

(65) Prior Publication Data

US 2015/0178593 A1    Jun. 25, 2015

(30) Foreign Application Priority Data

Dec. 24, 2013  (CN) .......................... 2013 1 0723030

(51) Int. Cl.
| G06K 9/62 | (2006.01) |
|---|---|
| G06T 7/00 | (2006.01) |
| G06T 7/60 | (2006.01) |
| G06K 9/46 | (2006.01) |

(52) U.S. Cl.
CPC ........... *G06K 9/6217* (2013.01); *G06K 9/4604* (2013.01); *G06K 9/6202* (2013.01); *G06T 7/004* (2013.01)

(58) Field of Classification Search
None
See application file for complete search history.

(56) References Cited

U.S. PATENT DOCUMENTS

| 6,735,343 | B2 | 5/2004 | Michael | |
|---|---|---|---|---|
| 7,769,236 | B2 | 8/2010 | Fiala | |
| 8,081,798 | B2 | 12/2011 | Paglieroni | |
| 2009/0252373 | A1* | 10/2009 | Paglieroni | G06K 9/00637 382/103 |
| 2010/0098324 | A1* | 4/2010 | Fujieda | B25J 9/1697 382/154 |

OTHER PUBLICATIONS

Nain et al., "Corner Detection using Difference Chain Code as Curvature," Proceedings of the International MultiConference of Engineers and Computer Scientist 2008, vol. 1, International Association of Engineers, Hong Kong, China (Mar. 19-21, 2008).
Prasad et al., "High Performance Algorithms for Object Recognition Problem by Multiresolution Template Matching," Proceeding of the Seventh International Conference on Tools with Artificial Intelligence 1995, pp. 362-365, Institute of Electrical and Electronics Engineers, New York, New York (Nov. 5-8, 1995).

(Continued)

*Primary Examiner* — Jon Chang
(74) *Attorney, Agent, or Firm* — Leydig, Voit & Mayer, Ltd.

(57) ABSTRACT

The present invention discloses a method and an apparatus for detecting a convex polygon image block, and a device. The method includes: acquiring an image collected by an image sensor; acquiring a corner set, where the corner set includes a corner in the image, and the corner is an intersection point at which any two straight line sides that are not parallel to each other in the image intersect; and detecting a convex polygon image block in the image according to the corner set, where a shape of the convex polygon image block is a preset shape and a similarity between the convex polygon image block and a preset image block exceeds a preset first threshold. The apparatus includes: a first acquiring module, a second acquiring module, and a detecting module. In the present invention, the convex polygon image block can be detected from the image.

12 Claims, 7 Drawing Sheets

(56) References Cited

OTHER PUBLICATIONS

Stock et al., "Subpixel Corner Detection for Tracking Applications using CMOS Camera Technology," $26^{th}$ Workshop of the Austrian Association for Pattern Recognition, pp. 191-199, Graz, Austria (Sep. 2002).

Kato et al., "Marker Tracking and HMD Calibration for a Video-based Augmented Reality Conferencing System," $2^{nd}$ IEEE and ACM International Workshop on Augmented Reality, Institute of Electrical and Electronics Engineers, New York, New York (Oct. 20-21, 1999).

* cited by examiner

METHOD, APPARATUS, AND DEVICE FOR DETECTING CONVEX POLYGON IMAGE BLOCK

CROSS-REFERENCE TO RELATED APPLICATION

This application claims priority to Chinese Patent Application No. 201310723030.0, filed on Dec. 24, 2013, which is hereby incorporated by reference in its entirety.

TECHNICAL FIELD

The present invention relates to the computer field, and in particular, to a method and an apparatus for detecting a convex polygon image block, and a device.

BACKGROUND

The augmented reality technology is a new technology that is developed on the basis of virtual reality and is a technology that increases a user's perception towards the real world by using information provided by a computer system. Virtual information is applied to the real world, and the virtual information such as a virtual object or scene or a system prompt generated by a computer is superimposed on a real scene, thereby implementing reality augmentation.

The augmented reality technology includes three steps: locating a real scene in an image, generating virtual information, and adding the generated virtual information to the located scene. When the real scene in the image is being located, a convex polygon image block in the image needs to be detected firstly, and the real scene in the image is located by using the detected convex polygon image block. However, currently, no method has been used to detect the convex polygon image block from the image.

SUMMARY

In order to detect a convex polygon image block from an image, the present invention provides a method and an apparatus for detecting a convex polygon image block, and a device. Technical solutions are as follows:

According to a first aspect, a method for detecting a convex polygon image block is provided, where the method includes:

acquiring an image collected by an image sensor;

acquiring a corner set, where the corner set includes a corner in the image, and the corner is an intersection point at which any two straight line sides that are not parallel to each other in the image intersect; and detecting a convex polygon image block from the image according to the corner set, where a shape of the convex polygon image block is a preset shape and a similarity between the convex polygon image block and a preset image block exceeds a preset first threshold.

With reference to the first aspect, in a first possible implementation manner of the first aspect, the acquiring a corner set includes:

acquiring a candidate corner set, where a candidate corner in the candidate corner set is a pixel, of which a corner response value is greater than a preset second threshold, in the image, a contour point included by a contour of a connected component in the image, or an edge point included by an edge of an object in the image; and selecting, from the candidate corner set, a candidate corner which is an intersection point where two straight line sides that are not parallel to each other intersect, using the selected candidate corner as a corner, and forming a corner set.

With reference to the first possible implementation manner of the first aspect, in a second possible implementation manner of the first aspect, the selecting, from the candidate corner set, a candidate corner which is an intersection point where two straight line sides that are not parallel to each other intersect includes:

using the candidate corner as a center, determining an N×N image area, and acquiring, from the image area, a pixel of which a gradient magnitude is greater than a preset third threshold, where N is an odd number greater than or equal to 3;

sorting, according to a size of a horizontal gradient component of each acquired pixel, the acquired pixels to obtain a column of pixels;

acquiring pixel sequences from the column of pixels, where an angle between gradient directions of any two neighboring pixels in the pixel sequences is less than a preset angle threshold; and if at least two pixel sequences in which the number of pixels is greater than or equal to a preset first number exist in the acquired pixel sequences, determining the candidate corner as an intersection point at which two straight line sides that are not parallel to each other intersect, and selecting the candidate corner.

With reference to the first aspect, in a third possible implementation manner of the first aspect, before the acquiring, from the image area, a pixel of which a gradient magnitude is greater than a preset third threshold, the method further includes:

calculating a gradient magnitude and a gradient direction of each pixel according to a gray value of each pixel included in the image area.

With reference to the first aspect, in a fourth possible implementation manner of the first aspect, after the using the selected candidate corner as a corner, the method further includes:

selecting, from the acquired pixel sequences, two pixel sequences in which the number of pixels is greater than or equal to the preset first number; and separately calculating an average value of gradient directions of pixels in the two selected pixel sequences, and respectively using the two average values obtained by calculation as gradient directions of two straight line sides corresponding to the corner.

With reference to the first aspect, in a fifth possible implementation manner of the first aspect, the detecting a convex polygon image block from the image according to the corner set, where a shape of the convex polygon image block is a preset shape and a similarity between the convex polygon image block and a preset image block exceeds a preset first threshold includes:

acquiring, according to gradient directions of two straight line sides corresponding to each corner in the corner set, a preset second number of corners, where the preset second number of corners can form a convex polygon whose shape is the preset shape;

forming, by using the preset second number of corners, the convex polygon whose shape is the preset shape, and acquiring, from the image, a convex polygon image block of the preset shape; and retaining the acquired convex polygon image block if a similarity between the acquired convex polygon image block and the preset image block exceeds the preset first threshold.

According to a second aspect, an apparatus for detecting a convex polygon image block is provided, where the apparatus includes:

a first acquiring module, configured to acquire an image collected by an image sensor;

a second acquiring module, configured to acquire a corner set, where the corner set includes a corner in the image, and the corner is an intersection point at which any two straight line sides that are not parallel to each other in the image intersect; and a detecting module, configured to detect a convex polygon image block from the image according to the corner set, where a shape of the convex polygon image block is a preset shape and a similarity between the convex polygon image block and a preset image block exceeds a preset first threshold.

With reference to the second aspect, in a first possible implementation manner of the second aspect, the second acquiring module includes:

a first acquiring unit, configured to acquire a candidate corner set, where a candidate corner in the candidate corner set is a pixel, of which a corner response value is greater than a preset second threshold, in the image, a contour point included by a contour of a connected component in the image, or an edge point included by an edge of an object in the image; and a selecting unit, configured to select, from the candidate corner set, a candidate corner which is an intersection point at which two straight line sides that are not parallel to each other intersect, use the selected candidate corner as a corner, and form a corner set.

With reference to the second aspect, in a second possible implementation manner of the second aspect, the selecting unit includes:

a first acquiring subunit, configured to use the candidate corner as a center, determine an N×N image area, and acquire, from the image area, a pixel of which a gradient magnitude is greater than a preset third threshold, where N is an odd number greater than or equal to 3;

a sorting subunit, configured to sort, according to a size of a horizontal gradient component of each acquired pixel, the acquired pixels to obtain a column of pixels;

a second acquiring subunit, configured to acquire pixel sequences from the column of pixels, where an angle between gradient directions of any two neighboring pixels in the pixel sequences is less than a preset angle threshold; and a determining subunit, configured to, if at least two pixel sequences in which the number of pixels is greater than or equal to a preset first number exist in the acquired pixel sequences, determine the candidate corner as an intersection point at which two straight line sides that are not parallel to each other intersect, and select the candidate corner.

With reference to the second aspect, in a third possible implementation manner of the second aspect, the selecting unit further includes:

a first calculating subunit, configured to calculate a gradient magnitude and a gradient direction of each pixel according to a gray value of each pixel included in the image area.

With reference to the second aspect, in a fourth possible implementation manner of the second aspect, the selecting unit further includes:

a selecting subunit, configured to select, from the acquired pixel sequences, two pixel sequences in which the number of pixels is greater than or equal to the preset first number; and a second calculating subunit, configured to separately calculate an average value of gradient directions of pixels in the two selected pixel sequences, and use the two average values obtained by calculation as gradient directions of two straight line sides corresponding to the corner.

With reference to the second aspect, in a fifth possible implementation manner of the second aspect, the detecting module includes:

a second acquiring unit, configured to acquire, according to gradient directions of two straight line sides corresponding to each corner in the corner set, a preset second number of corners, where the preset second number of corners can form a convex polygon whose shape is the preset shape;

a forming unit, configured to form, by using the preset second number of corners, the convex polygon whose shape is the preset shape, and acquire, from the image, a convex polygon image block of the preset shape; and a retaining unit, configured to retain the acquired convex polygon image block if a similarity between the acquired convex polygon image block and the preset image block exceeds the preset first threshold.

According to a third aspect, a device is provided, where the device includes:

a memory and a processor, which are configured to perform the method for detecting a convex polygon image block.

In the embodiments of the present invention, an image collected by an image sensor is acquired and a corner set is acquired, where the corner set includes a corner in the image, and the corner is an intersection point at which any two straight line sides that are not parallel to each other in the image intersect; and a convex polygon image block is detected from the image according to the corner set, where a shape of the convex polygon image block is a preset shape and a similarity between the convex polygon image block and a preset image block exceeds a preset first threshold. In this way, the convex polygon image block is automatically detected from the image.

BRIEF DESCRIPTION OF DRAWINGS

FIG. 2-1 is a flowchart of a method for detecting a convex polygon image block according to Embodiment 2 of the present invention;

FIG. 2-2 is a schematic diagram of a 5×5 image area that uses a candidate corner as a center according to Embodiment 2 of the present invention;

FIG. 2-3 is a flowchart of a method for acquiring a pixel sequence according to Embodiment 2 of the present invention;

FIG. 2-4 is a schematic diagram of a gradient direction of a corner according to Embodiment 2 of the present invention;

FIG. 3 is a flowchart of a method for detecting a convex polygon image block according to Embodiment 3 of the present invention;

FIG. 4 is a flowchart of a method for detecting a convex polygon image block according to Embodiment 4 of the present invention;

DESCRIPTION OF EMBODIMENTS

To make the objectives, technical solutions, and advantages of the present invention clearer, the following further describes the embodiments of the present invention in detail with reference to the accompanying drawings.

Embodiment 1

Figure 1:
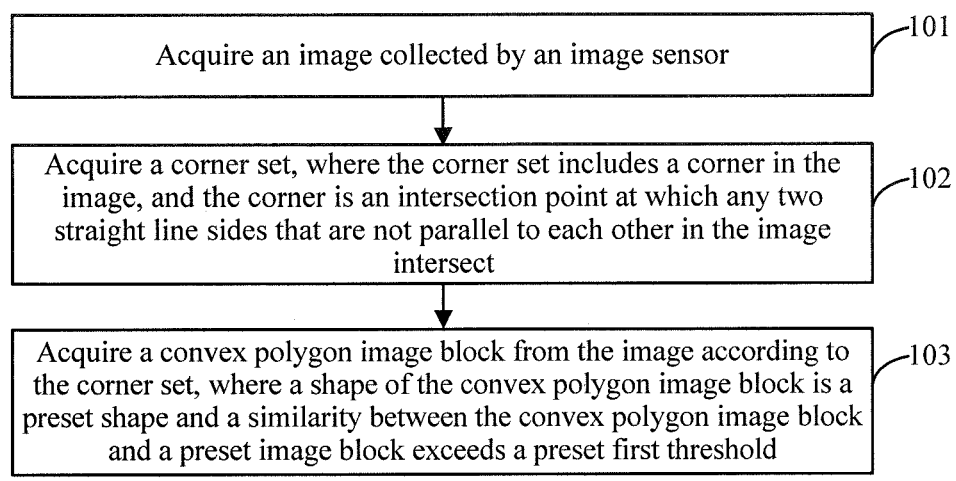
FIG. 1 is a flowchart of a method for detecting a convex polygon image block according to Embodiment 1 of the present invention.

Referring to FIG. 1, this embodiment of the present invention provides a method for detecting a convex polygon image block, and the method includes:

Step 101: Acquire an image collected by an image sensor;

Step 102: Acquire a corner set, where the corner set includes a corner in the image, and the corner is an intersection point at which any two straight line sides that are not parallel to each other in the image intersect; and Step 103: Acquire a convex polygon image block from the image according to the corner set, where a shape of the convex polygon image block is a preset shape and a similarity between the convex polygon image block and a preset image block exceeds a preset first threshold.

In this embodiment of the present invention, an image collected by an image sensor is acquired and a corner set is acquired, where the corner set includes a corner in the image, and the corner is an intersection point at which any two straight line sides that are not parallel to each other in the image intersect; and a convex polygon image block is detected from the image according to the corner set, where a shape of the convex polygon image block is a preset shape and a similarity between the convex polygon image block and a preset image block exceeds a preset first threshold. In this way, the convex polygon image block is automatically detected from the image.

Embodiment 2

Figures 1, 2:
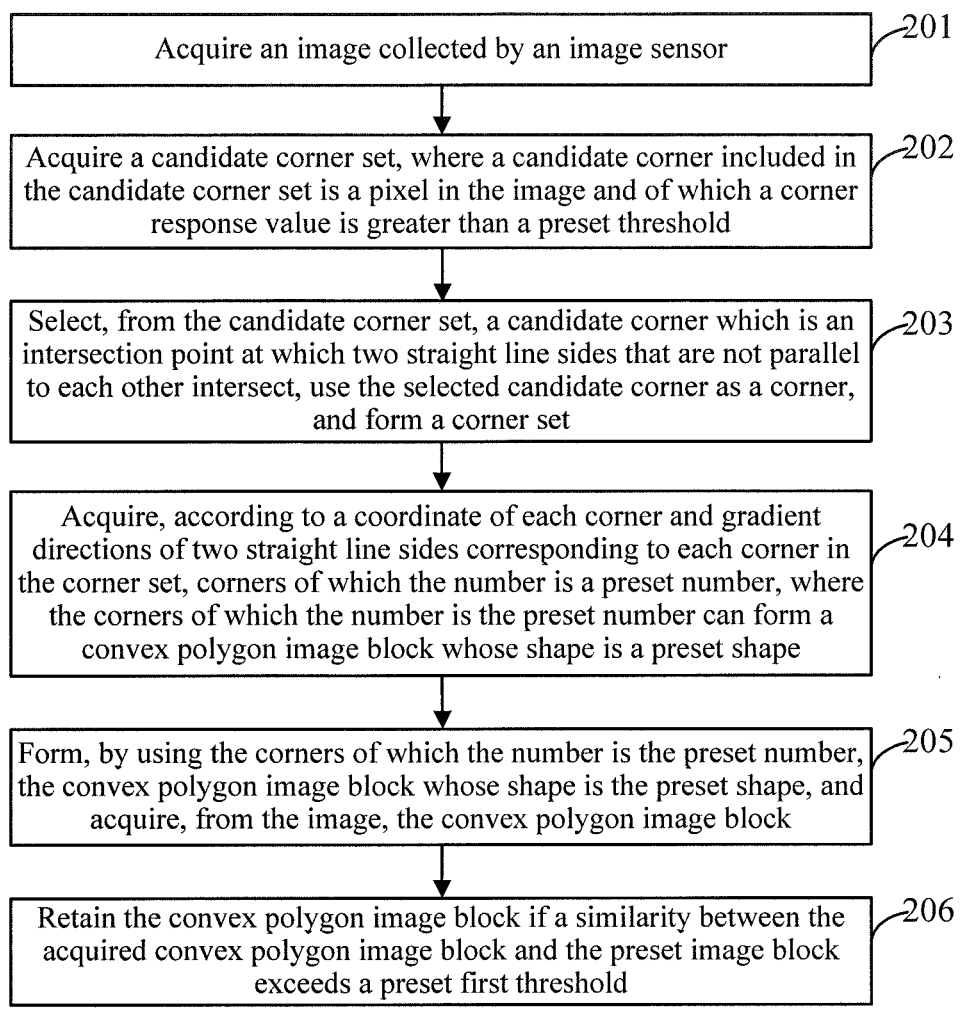
Figure 2:
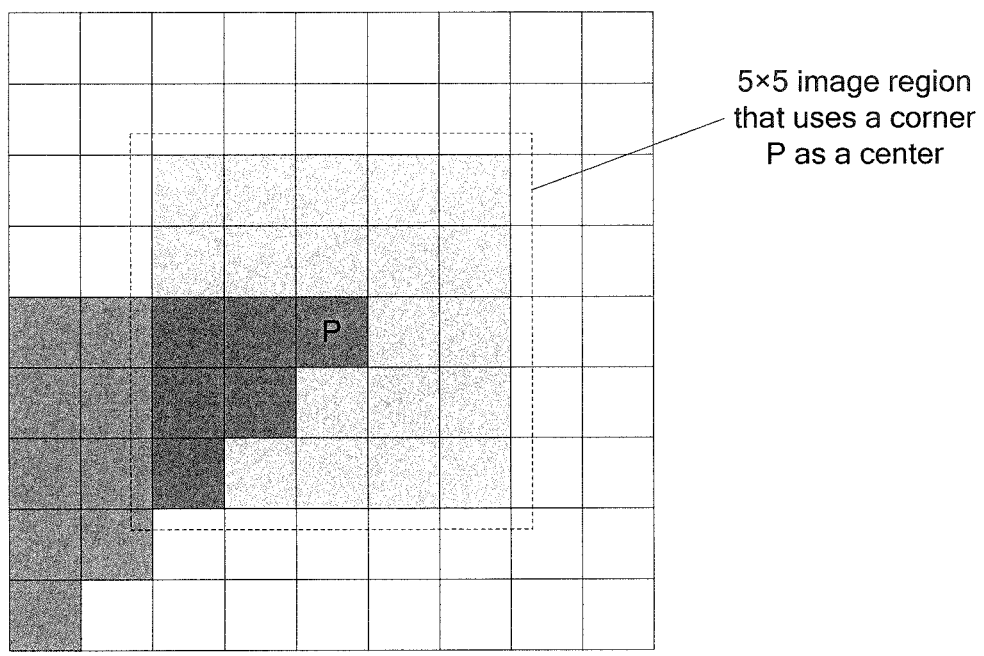

Referring to FIG. 2-1, this embodiment of the present invention provides a method for detecting a convex polygon image block, and the method includes:

Step 201: Acquire an image collected by an image sensor.

Step 202: Acquire a candidate corner set, where a candidate corner included in the candidate corner set is a pixel, of which a corner response value is greater than a preset second threshold, in the image.

Specifically, the following step 2021 to step 2023 may be used to implement the foregoing step 202, including:

2021: Acquire a gray value of each pixel included in the image;

2022: Calculate a corner response value of each pixel according to the acquired gray value of each pixel, a preset first matrix, and a preset second matrix.

For any pixel in the image, the following step (A-1) to step (A-8) may be used to calculate a corner response value of the pixel, including:

(A-1): Acquire a gray value of the pixel, and acquire gray values of two left-right neighboring pixels of the pixel that are in a row in which the pixel is located, form a first horizontal matrix by using the gray value of the pixel and the acquired gray values of the two pixels, and perform a convolution operation on the first horizontal matrix and the preset first matrix, so as to obtain a horizontal first-order differential of the pixel.

For example, the preset first matrix may be |1, 0, −1|, |2, 0, −2|, or the like. An example that the preset first matrix is |1, 0, −1| is used for description; however, the example is not used to limit the protection scope of the present invention. It is assumed that the gray value of the pixel is 120, and the gray values of the two left-right neighboring pixels of the pixel that are in the row in which the pixel is located are respectively 50 and 60. A first horizontal matrix |50, 120, 60| is formed by using the acquired gray values 50, 120, and 60, and a horizontal first-order differential Ix of the pixel may be calculated according to the following formula (1):

$$Ix = |50,120,60| \otimes |1,0,-1| = 50 \times 1 + 120 \times 0 + 60 \times (-1) = -10 \quad (1)$$

In the foregoing formula (1), $\otimes$ is a convolution operator.

(A-2): Acquire, from a column in which the pixel is located, gray values of two up-down neighboring pixels of the pixel, form a first vertical matrix by using the gray value of the pixel and the acquired gray values of the two pixels, and perform a convolution operation on the first vertical matrix and a transpose matrix of the preset first matrix, so as to obtain a vertical first-order differential of the pixel.

For example, the transpose matrix of the preset first matrix is $$\begin{pmatrix} 1 \\ 0 \\ -1 \end{pmatrix}.$$

The gray values of the two up-down neighboring pixels of the pixel that are in the column in which the pixel is located are respectively 30 and 20, a first vertical matrix $$\begin{pmatrix} 30 \\ 120 \\ 20 \end{pmatrix}$$

is formed by using the acquired gray values 30, 120, and 20, and a vertical first-order differential Iy of the pixel may be calculated according to the following formula (2):

$$Iy = \begin{pmatrix} 30 \\ 120 \\ 20 \end{pmatrix} \otimes \begin{pmatrix} 1 \\ 0 \\ -1 \end{pmatrix}$$
$$= 30 \times 1 + 120 \times 0 + 20 \times (-1)$$
$$= 10 \quad (2)$$

(A-3): Acquire, from the row in which the pixel is located, two pixels that are on the left of and closest to the pixel, and two pixels that are on the right of and closest to the pixel, and separately calculate a horizontal first-order differential of the four pixels.

For each of the four pixels, the horizontal first-order differential of each pixel is calculated according to the foregoing step (A-1), and a specific calculation method is not described in detail again.

(A-4): Form a second horizontal matrix by using the horizontal first-order differential of the pixel and horizontal first-order differentials of the four pixels, and perform a convolution operation on the second horizontal matrix and the preset second matrix, so as to obtain a horizontal second-order differential of the pixel.

For example, the preset second matrix may be $|1/16, 1/4, 1, 1/4, 1/16|$ or the like. In the row in which the pixel is located, acquired horizontal first-order differentials of the two pixels that are on the left of and closest to the pixel are 5 and 6; acquired horizontal first-order differentials of the two pixels that are on the right of and closest to the pixel are 1 and −5; a second horizontal matrix $|5, 6, −10, 1, −5|$ is formed by using the horizontal first-order differential −10 of the pixel and the horizontal first-order differentials 5, 6, 1, and −5 of the four pixels; and a horizontal second-order differential A of the pixel may be calculated according to the following formula (3):

$$A=(|5,6,-10,1,-5|)^2 \otimes |1/16,1/4,1,1/4,1/16|=5^2 \times 1/16 + 6^2 \times 1/4 + (10)^2 \times 1 + 1^2 \times 1/4 + (-5)^2 \times 1/16 = 112.4 \quad (3)$$

(A-5): Acquire, from the column in which the pixel is located, two pixels that are above the pixel and closest to the pixel, and two pixels that are below the pixel and closest to the pixel, and separately calculate a vertical first-order differential of the four pixels.

For each of the four pixels, the vertical first-order differential of each pixel is calculated according to the foregoing step (A-2), and a specific calculation method is not described in detail again.

(A-6): Form a second vertical matrix by using the vertical first-order differential of the pixel and vertical first-order differentials of the four pixels, and perform a convolution operation on the second vertical matrix and a transpose matrix of the preset second matrix, so as to obtain a vertical second-order differential of the pixel.

For example, the transpose matrix of the preset second matrix is $$\begin{pmatrix} \frac{1}{16} \\ \frac{1}{4} \\ 1 \\ \frac{1}{4} \\ \frac{1}{16} \end{pmatrix}.$$

In the column in which the pixel is located, acquired vertical first-order differentials of the two pixels that are above the pixel and closest to the pixel are −10 and −8; acquired vertical first-order differentials of the two pixels that are below the pixel and closest to the pixel are 12 and 0; a second vertical matrix $$\begin{pmatrix} -10 \\ -8 \\ 10 \\ 12 \\ 0 \end{pmatrix}$$

is formed by using the vertical first-order differential 10 of the pixel and the vertical first-order differentials −10, −8, 12, and 0 of the four pixels; and a vertical second-order differential B of the pixel may be calculated according to the following formula (4):

$$B = \begin{pmatrix} -10 \\ -8 \\ 10 \\ 12 \\ 0 \end{pmatrix} \otimes \begin{pmatrix} \frac{1}{16} \\ \frac{1}{4} \\ 1 \\ \frac{1}{4} \\ \frac{1}{16} \end{pmatrix} \quad (4)$$

$$= \begin{pmatrix} (-10)^2 \\ (-8)^2 \\ 10^2 \\ 12^2 \\ 0 \end{pmatrix} \otimes \begin{pmatrix} \frac{1}{16} \\ \frac{1}{4} \\ 1 \\ \frac{1}{4} \\ \frac{1}{16} \end{pmatrix}$$

$$= (-10)^2 \times \frac{1}{16} + (-8)^2 \times \frac{1}{4} + 10^2 \times 1 + 12^2 \times \frac{1}{4} + 0 \times \frac{1}{16}$$

$$= 158.3$$

(A-7): Calculate a mixed second-order differential of the pixel according to the preset second matrix, the horizontal first-order differential of the pixel, and the vertical first-order differential of the pixel.

Specifically, a product operation is performed on the horizontal first-order differential and the vertical first-order differential of the pixel to obtain a first value; a product operation is performed on the preset second matrix and the transpose matrix of the preset second matrix to obtain a second value; and a convolution operation is performed on the first value and the second value to obtain the mixed second-order differential of the pixel.

For example, a mixed second-order differential C of the pixel may be calculated according to the following formula (5):

$$C = [Iy \times Ix] \otimes \left[ \left| \frac{1}{16}, \frac{1}{4}, 1, \frac{1}{4}, \frac{1}{16} \right| \times \begin{pmatrix} \frac{1}{16} \\ \frac{1}{4} \\ 1 \\ \frac{1}{4} \\ \frac{1}{16} \end{pmatrix} \right] \quad (5)$$

$$= -100 \otimes 1.1$$

$$= -110$$

(A-8): Calculate a corner response value of the pixel according to the horizontal second-order differential, the vertical second-order differential, and the mixed second-order differential of the pixel that are obtained by calculation.

For example, a corner response value R of the pixel is calculated according to the following formula (6):

$$R = AB - C^2 - k(A+B)^2 \quad (6);$$

In the foregoing formula (6), k is a corner response coefficient, and a value of k may be greater than or equal to 0.04, and less than or equal to 0.06.

If k is 0.04, R=112.4×158.3)−(−110)²−0.04×(112.4+158.3)²=2761.8

2023: Determine the pixel of which the corner response value is greater than the preset second threshold as the candidate corner, and form the candidate corner set by using the determined candidate corner.

Step 203: Select, from the candidate corner set, a candidate corner which is an intersection point where two straight line sides that are not parallel to each other intersect, use the selected candidate corner as a corner, and form a corner set.

Specifically, the following step 2031 to step 2035 may be used to implement the foregoing step 203, including:

2031: For any candidate corner in the candidate corner set, use the candidate corner as a center, and determine an N×N image area, where N is an odd number greater than or equal to 3.

For example, it is assumed that N is 5. Referring to FIG. 2-2, a candidate corner P in the candidate corner set is used as a center and a 5×5 image area is determined.

2032: Calculate a gradient, a gradient magnitude, and a gradient direction of each pixel according to a gray value of each pixel included in the N×N image area.

Specifically, for any pixel in the N×N image area, the following step (B-1) to step (B-3) may be used to calculate a gradient, a gradient magnitude, and a gradient direction of the pixel, including:

(B-1): Acquire a gray value of each pixel included in a 3×3 area that uses the pixel as a center, form a first gray value matrix, and perform a convolution operation on the first gray value matrix and a preset third matrix, so as to obtain a horizontal gradient component of the pixel.

For example, the preset third matrix may be $$\begin{pmatrix} 1 & 0 & -1 \\ 2 & 0 & -2 \\ 1 & 0 & -1 \end{pmatrix}$$

or the like. It is assumed that a gray value of the pixel is 130, and the gray value of each pixel included in the 3×3 area that uses the pixel as a center is shown in the following table 1:

TABLE 1

| 40 | 55  | 40 |
|----|-----|----|
| 70 | 130 | 90 |
| 20 | 60  | 30 |

A first gray value matrix $$\begin{pmatrix} 40 & 55 & 40 \\ 70 & 130 & 90 \\ 20 & 60 & 30 \end{pmatrix}$$

is formed by using the gray value of each pixel shown in table 1, and a horizontal gradient component G1 of the pixel may be calculated according to the following formula (7):

$$G1 = \begin{pmatrix} 40 & 55 & 40 \\ 70 & 130 & 90 \\ 20 & 60 & 30 \end{pmatrix} \otimes \begin{pmatrix} 1 & 0 & -1 \\ 2 & 0 & -2 \\ 1 & 0 & -1 \end{pmatrix} \quad (7)$$

$$= 40 \times 1 + 70 \times 2 + 20 \times 1 + 40 \times$$
$$(-1) + 90 \times (-2) + 30 \times (-1)$$
$$= -50$$

(B-2): Perform a convolution operation on the first gray value matrix and a transpose matrix of the preset third matrix, so as to obtain a vertical gradient component of the pixel.

For example, the transpose matrix of the preset third matrix is $$\begin{pmatrix} 1 & 2 & 1 \\ 0 & 0 & 0 \\ -1 & -2 & -1 \end{pmatrix},$$

a vertical gradient component G2 of the pixel may be calculated according to the following formula (8):

$$G2 = \begin{pmatrix} 40 & 55 & 40 \\ 70 & 130 & 90 \\ 20 & 60 & 30 \end{pmatrix} \otimes \begin{pmatrix} 1 & 2 & 1 \\ 0 & 0 & 0 \\ -1 & -2 & -1 \end{pmatrix} \quad (8)$$

$$= 40 \times 1 + 55 \times 2 + 40 \times 1 + 20 \times$$
$$(-1) + 60 \times (-2) + 30 \times (-1)$$
$$= 20$$

(B-3): Calculate the gradient, the gradient magnitude, and the gradient direction of the pixel according to the horizontal gradient component and the vertical gradient component of the pixel.

Specifically, the gradient of the pixel is formed by using the horizontal gradient component and the vertical gradient component of the pixel. A first square value of the horizontal gradient component and a second square value of the vertical gradient component of the pixel are calculated; the first square value and the second square value are accumulated; a square root extraction operation is performed on an accumulated value to obtain a value; and the value is used as the gradient magnitude of the pixel. A ratio of the horizontal gradient component of the pixel to the vertical gradient component of the pixel is calculated; an arctangent operation is performed on the ratio obtained by calculation to obtain an angle, where the angle is an angle at which the gradient of the pixel rotates clockwise in a horizontal right direction; and the angle is determined as the gradient direction of the pixel.

For example, a gradient gradG=−50 $\vec{i}$ +20 $\vec{j}$ of the pixel is formed by using a horizontal gradient component −50 and a vertical gradient component 20 of the pixel. A first square value 2500 of the horizontal gradient component −50 of the pixel is calculated; a second square value 400 of the vertical gradient component 20 is calculated; the first square value 2500 and the second square value 400 are accumulated to obtain an accumulated value 2900; a square root extraction operation is performed on the accumulated value 2900 to obtain a value 53.9; and the value 53.9 is used as the gradient magnitude of the pixel. A ratio −0.4 of the vertical gradient component 20 of the pixel to the horizontal gradient component −50 of the pixel is calculated; an arctangent operation arctan(−0.4)=−21.8 is performed on the ratio −0.4 to obtain that an angle of −21.8 degrees at which the gradient of the pixel rotates clockwise in a horizontal right direction; and the angle is determined as the gradient direction of the pixel.

Further, a gradient, a gradient magnitude, and a gradient direction of each of other pixels included in the N×N image area may be calculated successively according to step (B-1) to step (B-3).

2033: Acquire pixels of which gradient magnitudes are greater than a preset third threshold, and sort, according to sizes of horizontal gradient components, the acquired pixels to obtain a column of pixels.

The preset third threshold may be an average value of the gradient magnitudes of all pixels included in the N×N image area and may be set according to another method, which is not limited in the present invention.

2034: Acquire pixel sequences from the column of pixels, where an angle between gradient directions of any two neighboring pixels in the pixel sequences is less than a preset angle threshold.

Figures 2, 3:
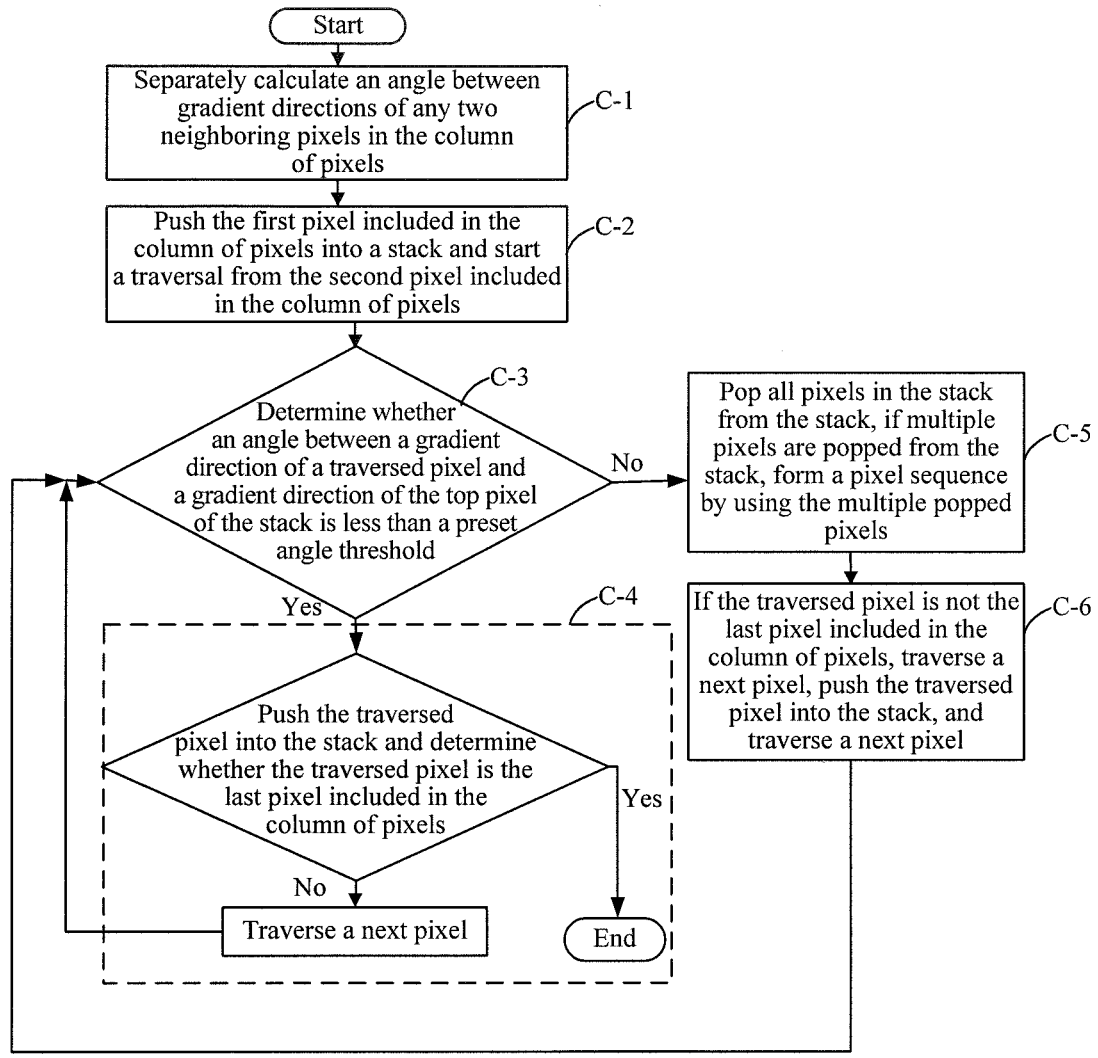

Specifically, referring to FIG. 2-3, the following step (C-1) to step (C-6) may be used to implement the foregoing step 2034, including:

(C-1): Separately calculate an angle between gradient directions of two neighboring pixels in the column of pixels.

(C-2): Push the first pixel included in the column of pixels into a stack and start a traversal from the second pixel included in the column of pixels.

In this case, the top pixel of the stack is the first pixel pushed into the stack.

(C-3): Determine whether an angle between a gradient direction of a traversed pixel and a gradient direction of the top pixel of the stack is less than the preset angle threshold, if the angle between the gradient direction of the traversed pixel and the gradient direction of the top pixel of the stack is less than the preset angle threshold, perform step (C-4); and if the angle between the gradient direction of the traversed pixel and the gradient direction of the top pixel of the stack is not less than the preset angle threshold, perform step (C-5).

(C-4): Push the traversed pixel into the stack, and if the traversed pixel is not the last pixel included in the column of pixels, traverse a next pixel, and return to perform step (C-3).

In this case, the top pixel of the stack is the traversed pixel. If the traversed pixel is the last pixel included in the column of pixels, the operation ends.

(C-5): Pop all pixels in the stack from the stack, and if multiple pixels are popped from the stack, form a pixel sequence by using the multiple popped pixels.

(C-6): If the traversed pixel is not the last pixel included in the column of pixels, traverse a next pixel, push the traversed pixel into the stack, traverse the next pixel, and return to perform step (C-3).

If the traversed pixel is the last pixel included in the column of pixels, the operation ends.

For example, the column of pixels are a pixel A, a pixel B, a pixel C, a pixel D, a pixel E, a pixel F, and a pixel G. It is calculated that an angle between a gradient direction of the pixel A and a gradient direction of the pixel B is 0.3 degrees; an angle between the gradient direction of the pixel B and a gradient direction of the pixel C is 0.15 degrees; an angle between the gradient direction of the pixel C and a gradient direction of the pixel D is 0.2 degrees; an angle between the gradient direction of the pixel D and a gradient direction of the pixel E is 0.6 degrees; an angle between the gradient direction of the pixel E and a gradient direction of the pixel F is 0.3 degrees; and an angle between the gradient direction of the pixel F and a gradient direction of the pixel G is 0.24 degrees. A preset angle is 0.5 degrees.

The pixel A is pushed into the stack; the traversal starts from the pixel B; in this case, the pixel A is the top pixel of the stack; the angle between the gradient direction of the pixel B and the gradient direction of the pixel A is 0.3 degrees and is less than the preset angle 0.5 degrees; therefore, the pixel B is pushed into the stack; and in this case, the pixel B is the top pixel of the stack. Traversal of the column of pixels continues; when the pixel C is traversed, the angle between the gradient direction of the pixel B and the gradient direction of the pixel C is 0.15 degrees and is less than the preset angle 0.5 degrees, and the pixel C is pushed into the stack; and in this case the pixel C is the top pixel of the stack. Traversal of the column of pixels continues; when the pixel D is traversed, the angle between the gradient direction of the pixel C and the gradient direction of the pixel D is 0.2 degrees and is less than the preset angle 0.5 degrees; therefore, the pixel D is pushed into the stack; and in this case the pixel D is the top pixel of the stack. Traversal of the column of pixels continues; when the pixel E is traversed, the angle between the gradient direction of the pixel D and the gradient direction of the pixel E is 0.6 degrees and is greater than the preset angle 0.5 degrees, pixels in the stack are popped from the stack, and a pixel sequence is formed by using the pixel A, the pixel B, the pixel C, and the pixel D that are popped from the stack.

Because the traversed pixel E is not the last pixel in the column of pixels, the pixel E is pushed into the stack, and the transversal starts from the pixel F. In this case, the pixel E is the top pixel of the stack; the angle between the gradient direction of the pixel E and the gradient direction of the pixel F is 0.3 degrees and is less than the preset angle 0.5 degrees; therefore, the pixel F is pushed into the stack; and in this case the pixel F is the top pixel of the stack. Traversal of the column of pixels continues; when the pixel G is traversed, the angle between the gradient direction of the pixel F and the gradient direction of the pixel G is 0.24 degrees and is less than the preset angle 0.5 degrees; therefore, the pixel G is pushed into the stack; and in this case the pixel G is the top pixel of the stack. The pixel G is the last pixel in the column of pixels; therefore, the traversal ends; pixels in the stack are popped from the stack; and a pixel sequence is formed by using the pixel E, the pixel F, and the pixel G.

2035: If at least two pixel sequences in which the number of pixels is greater than or equal to a preset first number exist in the acquired pixel sequences, determine the candidate corner as an intersection point at which two straight line sides that are not parallel to each other intersect, and determine the candidate corner as a corner.

The preset first number may be N−1, N−2, N, or the like. Two straight lines formed by any two pixels sequences in which the number of pixels are greater than or equal to a preset first number greater than or equal to the preset first number are two straight line sides that are not parallel to each other, where the two straight line sides that are not parallel to each other and the corner may form an angle.

Further, two pixel sequences in which the number of pixels is greater than or equal to the preset first number are selected from the acquired pixel sequences; an average value of gradient directions of pixels included in the two pixel sequences is separately calculated; and the two average values obtained by calculation are respectively used as gradient directions of the two straight line sides corresponding to the corner.

For each of other candidate corners in the candidate corner set, a corner may be determined in each of other candidate corners according to the foregoing process from 2031 to 2035.

Step 204: Acquire, according to gradient directions of two straight line sides corresponding to each corner in the corner set, a preset second number of corners, where the preset second number of corners can form a convex polygon whose shape is a preset shape.

Specifically, the following step 2041 to step 2049 may be used to implement the foregoing step 204, including:

2041: Sort, according to sizes of horizontal gradient components, corners included in the corner set to obtain a column of corners.

2042: Push the first corner included in the column of corners into a stack and start a traversal from the second corner included in the column of corners.

In this case, the top corner of the stack is the first corner included in the column of corners.

2043: Determine, according to a preset determining criterion, whether a line segment between the top corner of the stack and a traversed corner forms a side of the convex polygon image block whose shape is the preset shape; if the line segment between the top corner of the stack and the traversed corner does not form a side of the convex polygon image block whose shape is the preset shape, perform step 2044; and if the line segment between the top corner of the stack and the traversed corner can form a side of the convex polygon image block whose shape is the preset shape, perform step 2045.

Specifically, a vector is formed by using the top corner of the stack and the traversed corner, where a direction of the vector points from the top corner of the stack to the traversed corner.

If an angle between the direction of the vector and a gradient direction of one side of two sides corresponding to the top corner of the stack is 90 degrees, and an angle between the direction of the vector and a gradient direction of the other side of the two sides corresponding to the top corner of the stack is greater than 90 degrees, it is determined that the line segment between the top corner of the stack and the traversed corner can form a side of the convex polygon image block whose shape is the preset shape; otherwise, it is determined that the line segment between the top corner of the stack and the traversed corner cannot form a side of the convex polygon image block whose shape is the preset shape.

If an angle between the gradient direction of one side of the two sides corresponding to the top corner of the stack and a gradient direction of one side of two sides corresponding to the traversed corner is 0 degrees, and an angle between the direction of the vector and a gradient direction of the other side of the two sides corresponding to the traversed corner is less than 90 degrees, it is determined that the line segment between the top corner of the stack and the traversed corner can form a side of the convex polygon image block whose shape is the preset shape; otherwise, it is determined that the line segment between the top corner of the stack and the traversed corner cannot form a side of the convex polygon image block whose shape is the preset shape.

Figures 2, 3, 4:
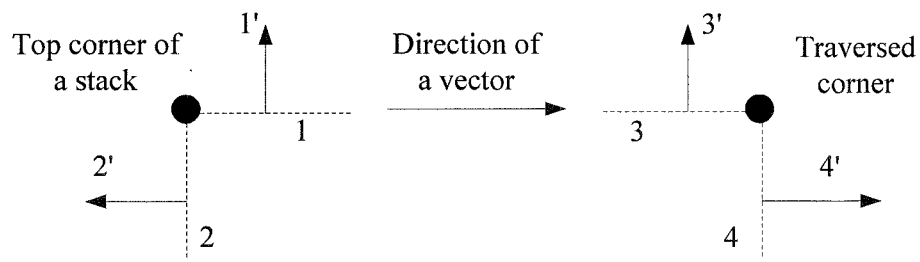
Figure 3:
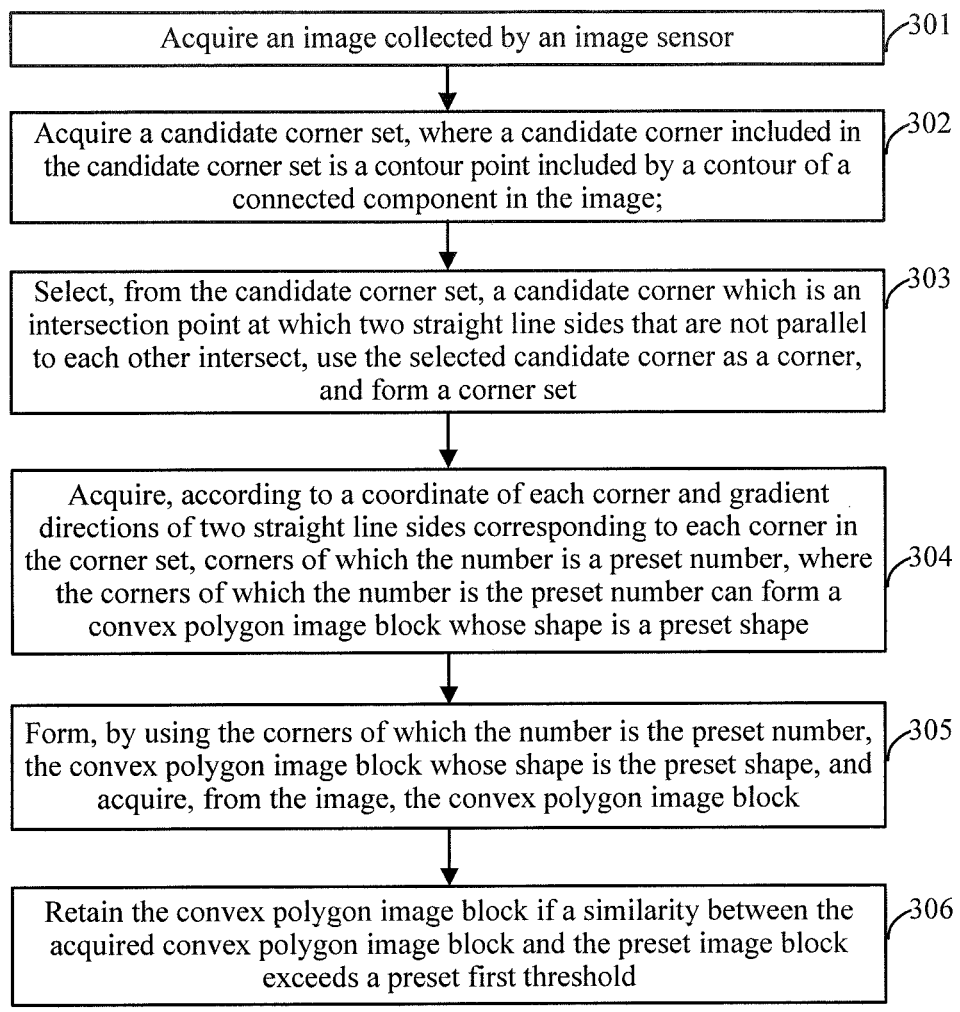
Figure 4:
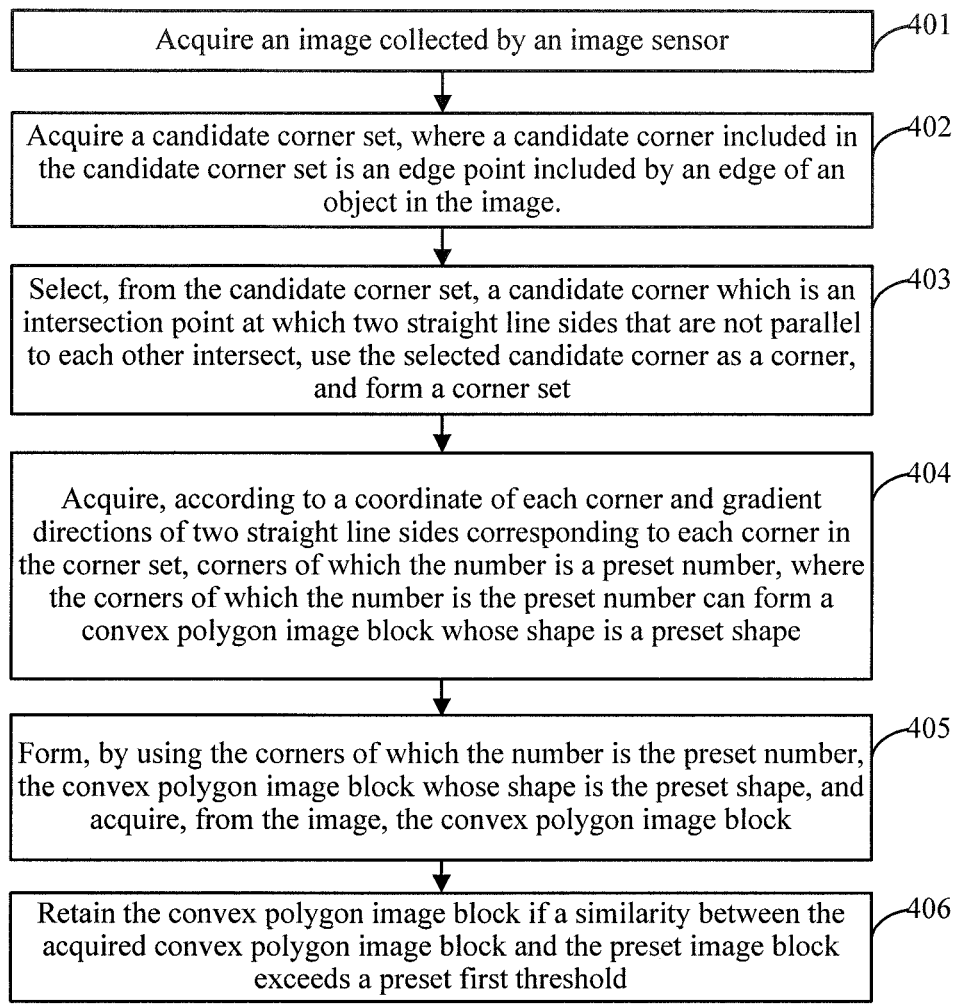

For example, gradient directions of the two sides corresponding to the top corner of the stack, gradient directions of the two sides corresponding to the traversed corner, and the direction of the vector formed by the top corner of the stack and the traversed corner are shown in FIG. 2-4. The two sides corresponding to the top corner of the stack are a side 1 and a side 2; the two sides corresponding to the traversed corner are a side 3 and a side 4; and each is denoted by a dashed line. A gradient direction of the side 1 is a direction 1'; a gradient direction of the side 2 is a direction 2; a gradient direction of the side 3 is a direction 3'; and a gradient direction of the side 4 is a direction 4. The direction of the vector formed by the top corner of the stack and the traversed corner points from the top corner of the stack to the traversed corner and is horizontally right.

An angle between the direction of the vector and the gradient direction 1 of the side 1 in the two sides corresponding to the top corner of the stack is 90 degrees; an angle between the direction of the vector and the gradient direction 2' of the side 2 in the two sides corresponding to the top corner of the stack is 180 degrees and greater than 90 degrees; therefore, it is determined that the line segment between the top corner of the stack and the traversed corner can form a side of the convex polygon image block whose shape is the preset shape.

An angle between the gradient direction 1' of the side 1 in the two sides corresponding to the top corner of the stack and the gradient direction 3' of the side 3 in the two sides corresponding to the traversed corner is 0 degrees; an angle between the direction of the vector and the gradient direction 4' of the side 4 in the two sides corresponding to the traversed corner is 0 degrees and less than 90 degrees; therefore, it is determined that the line segment between the top corner of the stack and the traversed corner can form a side of the convex polygon image block whose shape is the preset shape.

2044: If the traversed corner is not the last corner included in the column of corners, traverse a next corner included in the column of corners and return to perform step 2043.

If the traversed corner is the last corner included in the column of corners, the operation ends.

2045: Push the traversed corner into the stack and determine whether the number of corners included in the stack reaches the preset second number, if the number of corners does not reach the preset second number, perform step 2046, and if the number of corners reaches the preset second number, perform step 2047.

In this case, the top corner of the stack is the traversed corner.

2046: If the traversed corner is not the last corner included in the column of corners, traverse a next corner included in the column of corners and return to perform step 2043.

If the traversed corner is the last corner included in the column of corners, the operation ends.

2047: Determine, according to the preset determining criterion, whether a line segment between the top corner of the stack and a corner that is firstly pushed into the stack can form a side of the convex polygon image block of the preset shape.

Specifically, a vector is formed by using the top corner of the stack and the corner that is firstly pushed into the stack, where a direction of the vector points from the top corner of the stack to the corner that is firstly pushed into the stack.

If an angle between the direction of the vector and a gradient direction of one side of two sides corresponding to the top corner of the stack is 90 degrees, and an angle between the direction of the vector and a gradient direction of the other side of two sides corresponding to the top corner of the stack is greater than 90 degrees, it is determined that the line segment between the top corner of the stack and the corner that is firstly pushed into the stack can form a side of the convex polygon image block of the preset shape; otherwise, it is determined that the line segment between the top corner of the stack and the corner that is firstly pushed into the stack cannot form a side of the convex polygon image block of the preset shape.

If an angle between the gradient direction of one side of the two sides corresponding to the top corner of the stack and a gradient direction of one side of two sides corresponding to the corner that is firstly pushed into the stack is 0 degrees, and an angle between the direction of the vector and a gradient direction of the other side of the two sides corresponding to the corner that is firstly pushed into the stack is less than 90 degrees, it is determined that the line segment between the top corner of the stack and the corner that is firstly pushed into the stack can form a side of the convex polygon image block of the preset shape; otherwise, it is determined that the line segment between the top corner of the stack and the corner that is firstly pushed into the stack cannot form a side of the convex polygon image block of the preset shape.

2048: If the line segment between the top corner of the stack and the corner that is firstly pushed into the stack cannot form a side of the convex polygon image block of the preset shape, pop all the corners in the stack from the stack and discard the corners; and if the line segment between the top corner of the stack and the corner that is firstly pushed into the stack can form a side of the convex polygon image block of the preset shape, pop all the corners in the stack from the stack and retain the corners.

2049: If the number of corners that are located behind the traversed corner in the column of corners is greater than or equal to the preset second number, traverse a next corner and push the next traversed corner into the stack, traverse a next corner again, and return to perform step 2043.

If the number of corners that are located behind the traversed corner in the column of corners is less than the preset second number, the operation ends.

Step 205: Form, by using the acquired preset second number of corners, the convex polygon image block whose shape is the preset shape, and acquire, from the image, the convex polygon image block.

Step 206: Retain the convex polygon image block if a similarity between the acquired convex polygon image block and the preset image block exceeds a preset first threshold.

Specifically, a similarity between all acquired convex polygon image blocks and the preset image block is separately calculated, and a convex polygon image block is retained if a similarity between the convex polygon image block and the preset image block exceeds the preset first threshold.

Preferably, calculating a similarity between any acquired convex polygon image block and the preset image block may be:

finding, in the preset image block, a pixel corresponding to each pixel in the convex polygon image block; calculating a difference between a gray value of each pixel in the convex polygon image block and a gray value of a corresponding pixel in the preset image block; calculating an absolute value of each difference obtained by calculation; performing a summation operation on absolute values obtained by calculation to obtain the similarity between the convex polygon image block and the preset image block; and retaining the convex polygon image block if the obtained similarity exceeds the preset first threshold.

In this embodiment of the present invention, a corner set is acquired, where the corner set includes a corner in an image, and the corner is an intersection point at which any two straight line sides that are not parallel to each other in the image intersect; and a convex polygon image block is acquired from the image according to the corner set, where a shape of the convex polygon image block is a preset shape and a similarity between the convex polygon image block and a preset image block exceeds a preset first threshold; in this way, the convex polygon image block is automatically detected from the image. In addition, during corner acquiring, no other processing is performed on the image and all information in the image is retained, and complexity of a process of forming a convex polygon according to the corner is low; therefore, efficiency of detecting the convex polygon image block in the image is extremely high.

Embodiment 3

Referring to FIG. 3, this embodiment of the present invention provides a method for detecting a convex polygon image block, and the method includes:

Step 301: Acquire an image collected by an image sensor.

Step 302: Acquire a candidate corner set, where a candidate corner in the candidate corner set is a contour point included by a contour of a connected component in the image.

Specifically, a gray value of each pixel in the image is acquired; an average gray value is obtained by averaging acquired gray values; a gray value of a pixel in the image that is greater than or equal to the average gray value is set as a first gray value; and a gray value of a pixel in the image that is less than the average gray value is set as a second gray value. The original image is converted into a black-and-white image by performing the foregoing conversion process. A connected component in the black-white image is extracted by using an area growing method; a contour point included by a contour of the connected component is then extracted; and a candidate corner set is formed by using the extracted contour point.

The first gray value may be 255 or others and the second gray value may be 0 or others, which is not limited in the present invention.

Steps 303-306 are respectively the same as steps 203-206, and are not described in detail herein again.

In this embodiment of the present invention, a corner set is acquired, where the corner set includes a corner in an image, and the corner is an intersection point at which any two straight line sides that are not parallel to each other in the image intersect; and a convex polygon image block is detected from the image according to the corner set, where a shape of the convex polygon image block is a preset shape and a similarity between the convex polygon image block and a preset image block exceeds a preset first threshold. In this way, the convex polygon image block is automatically detected from the image.

Embodiment 4

Referring to FIG. 4, this embodiment of the present invention provides a method for detecting a convex polygon image block, and the method includes:

Step 401: Acquire an image collected by an image sensor.

Step 402: Acquire a candidate corner set, where a candidate corner included in the candidate corner set is an edge point included by an edge of an object in the image.

Specifically, the following step 4021 to step 4023 may be used to implement the foregoing step 402, including:

4021: Acquire a gray value of each pixel included in the image.

4022: Calculate an edge point response value of each pixel according to the acquired gray value of each pixel and a preset fourth matrix.

For any pixel in the image, the following steps may be used to calculate an edge point response value of the pixel, including:

acquiring a gray value of each pixel included in an M×M area that uses the pixel as a center, forming a second gray value matrix, and performing a convolution operation on the second gray value matrix and the preset fourth matrix, so as to obtain the edge point response value of the pixel, where M is a positive integer.

For example, the preset fourth matrix may be $$\begin{pmatrix} 0 & 1 & 0 \\ 1 & -4 & 1 \\ 0 & 1 & 0 \end{pmatrix}$$

or the like. It is assumed that a gray value of the pixel is 110, and a gray value of each pixel included in a 3×3 area that uses the pixel as a center are shown in the following table 2:

TABLE 2

| 20 | 40  | 40 |
|----|-----|----|
| 60 | 110 | 80 |
| 30 | 50  | 70 |

A second gray value matrix $$\begin{pmatrix} 20 & 40 & 40 \\ 60 & 110 & 80 \\ 30 & 50 & 70 \end{pmatrix}$$

is formed by using the gray value of each pixel shown in table 2, and an edge point response value S of the pixel is calculated according to the following formula (9):

$$S = \begin{pmatrix} 20 & 40 & 40 \\ 60 & 110 & 80 \\ 30 & 50 & 70 \end{pmatrix} \otimes \begin{pmatrix} 0 & 1 & 0 \\ 1 & -4 & 1 \\ 0 & 1 & 0 \end{pmatrix} \quad (9)$$

$$= 40 \times 1 + 60 \times 1 + 110 \times (-4) + 80 \times 1 + 50 \times 1$$

$$= -210.$$

4023: Determine a pixel of which an edge point response value is greater than a preset fourth threshold as a candidate corner, and form a candidate corner set by using all determined candidate corners.

Steps 403-406 are respectively the same as steps 203-206, and are not described in detail herein again.

In this embodiment of the present invention, a corner set is acquired, where the corner set includes a corner in an image, and the corner is an intersection point at which any two straight line sides that are not parallel to each other in the image intersect; and a convex polygon image block is detected from the image according to the corner set, where a shape of the convex polygon image block is a preset shape and a similarity between the convex polygon image block and a preset image block exceeds a preset first threshold. In this way, the convex polygon image block is automatically detected from the image.

Embodiment 5

Figure 5:
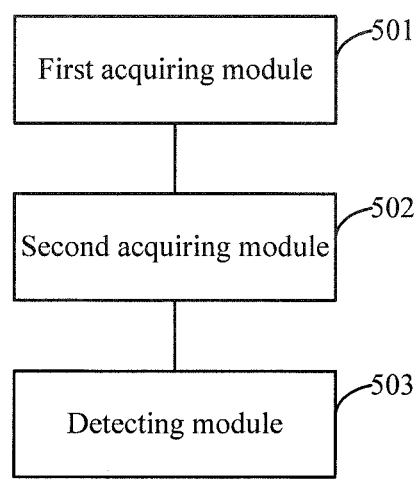
FIG. 5 is a structural schematic diagram of an apparatus for detecting a convex polygon image block according to Embodiment 5 of the present invention.

Referring to FIG. 5, this embodiment of the present invention provides an apparatus for detecting a convex polygon image block, and the apparatus includes:

a first acquiring module 501, configured to acquire an image collected by an image sensor;

a second acquiring module 502, configured to acquire a corner set, where the corner set includes a corner in the image, and the corner is an intersection point at which any two straight line sides that are not parallel to each other in the image intersect; and a detecting module 503, configured to detect a convex polygon image block from the image according to the corner set, where a shape of the convex polygon image block is a preset shape and a similarity between the convex polygon image block and a preset image block exceeds a preset first threshold.

Preferably, the second acquiring module 502 includes:

a first acquiring unit, configured to acquire a candidate corner set, where a candidate corner in the candidate corner set is a pixel, of which a corner response value is greater than a preset second threshold, in the image, a contour point included by a contour of a connected component in the image, or an edge point included by an edge of an object in the image; and a selecting unit, configured to select, from the candidate corner set, a candidate corner which is an intersection point where two straight line sides that are not parallel to each other intersect, use the selected candidate corner as a corner, and form a corner set.

Preferably, the selecting unit includes:

a first acquiring subunit, configured to use the candidate corner as a center, determine an N×N image area, and acquire, from the image area, a pixel of which a gradient magnitude is greater than a preset third threshold, where N is an odd number greater than or equal to 3;

a sorting subunit, configured to sort, according to a size of a horizontal gradient component of each acquired pixel, the acquired pixels to obtain a column of pixels;

a second acquiring subunit, configured to acquire pixel sequences from the column of pixels, where an angle between gradient directions of any two neighboring pixels in the pixel sequences is less than a preset angle threshold; and a determining subunit, configured to, if at least two pixel sequences in which the number of pixels is greater than or equal to a preset first number exist in the acquired pixel sequences, determine the candidate corner as an intersection point at which two straight line sides that are not parallel to each other intersect, and select the candidate corner.

Further, the selecting unit further includes:

a first calculating subunit, configured to calculate a gradient magnitude and a gradient direction of each pixel according to a gray value of each pixel included in the image area.

Further, the selecting unit further includes:

a selecting subunit, configured to select, from the acquired pixel sequences, two pixel sequences in which the number of pixels is greater than or equal to the preset first number; and a second calculating subunit, configured to separately calculate an average value of gradient directions of pixels in the two selected pixel sequences, and respectively use the two average values obtained by calculation as gradient directions of two straight line sides corresponding to the corner.

Preferably, the detecting module 503 includes:

a second acquiring unit, configured to acquire, according to gradient directions of two straight line sides corresponding to each corner in the corner set, a preset second number of corners, where the preset second number of corners can form a convex polygon whose shape is the preset shape;

a forming unit, configured to form, by using the preset second number of corners, the convex polygon whose shape is the preset shape, and acquire, from the image, a convex polygon image block of the preset shape; and a retaining unit, configured to retain the acquired convex polygon image block if a similarity between the acquired convex polygon image block and the preset image block exceeds the preset first threshold.

In this embodiment of the present invention, a corner set is acquired, where the corner set includes a corner in an image, and the corner is an intersection point at which any two straight line sides that are not parallel to each other in the image intersect; and a convex polygon image block is detected from the image according to the corner set, where a shape of the convex polygon image block is a preset shape and a similarity between the convex polygon image block and a preset image block exceeds a preset first threshold, In this way, the convex polygon image block is automatically detected from the image.

Embodiment 6

Figure 6:
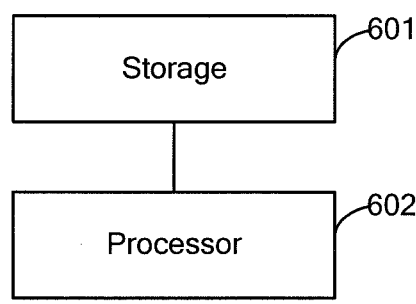
FIG. 6 is a schematic structural diagram of a device according to Embodiment 6 of the present invention.

Referring to FIG. 6, this embodiment of the present invention provides a device, and the device includes a memory 601 and a processor 602, which are configured to perform a method for detecting a convex polygon image block as follows:

acquiring an image collected by an image sensor;

acquiring a corner set, where the corner set includes a corner in the image, and the corner is an intersection point at which any two straight line sides that are not parallel to each other in the image intersect; and detecting a convex polygon image block from the image according to the corner set, where a shape of the convex polygon image block is a preset shape and a similarity between the convex polygon image block and a preset image block exceeds a preset first threshold.

Preferably, the acquiring a corner set includes:

acquiring a candidate corner set, where a candidate corner in the candidate corner set is a pixel, of which a corner response value is greater than a preset second threshold, in the image, a contour point included by a contour of a connected component in the image, or an edge point included by an edge of an object in the image; and selecting, from the candidate corner set, a candidate corner which is an intersection point where two straight line sides that are not parallel to each other intersect, using the selected candidate corner as a corner, and forming a corner set.

Preferably, the selecting, from the candidate corner set, a candidate corner which is an intersection point where two straight line sides that are not parallel to each other intersect includes:

using the candidate corner as a center, determining an N×N image area, and acquiring, from the image area, a pixel of which a gradient magnitude is greater than a preset third threshold, where N is an odd number greater than or equal to 3;

sorting, according to a size of a horizontal gradient component of each acquired pixel, the acquired pixels to obtain a column of pixels;

acquiring pixel sequences from the column of pixels, where an angle between gradient directions of any two neighboring pixels in the pixel sequences is less than a preset angle threshold; and if at least two pixel sequences in which the number of pixels is greater than or equal to a preset first number exist in the acquired pixel sequences, determining the candidate corner as an intersection point at which two straight line sides that are not parallel to each other intersect, and selecting the candidate corner.

Further, before the acquiring, from the image area, a pixel of which a gradient magnitude is greater than a preset third threshold, the method further includes:

calculating a gradient magnitude and a gradient direction of each pixel according to a gray value of each pixel included in the image area.

Further, after the using the selected candidate corner as a corner, the method further includes:

selecting, from the acquired pixel sequences, two pixel sequences in which the number of pixels is greater than or equal to the preset first number; and separately calculating an average value of gradient directions of pixels included in the two selected pixel sequences, and respectively using the two average values obtained by calculation as gradient directions of two straight line sides corresponding to the corner.

Preferably, the detecting a convex polygon image block from the image according to the corner set, where a shape of the convex polygon image block is a preset shape and a similarity between the convex polygon image block and a preset image block exceeds a preset first threshold includes:

acquiring, according to gradient directions of two straight line sides corresponding to each corner in the corner set, a preset second number of corners, where the preset second number of corners can form a convex polygon whose shape is the preset shape;

forming, by using the acquired preset second number of corners, the convex polygon whose shape is the preset shape, and acquiring, from the image, a convex polygon image block of the preset shape; and retaining the acquired convex polygon image block if a similarity between the acquired convex polygon image block and the preset image block exceeds the preset first threshold.

In this embodiment of the present invention, a corner set is acquired, where the corner set includes a corner in an image, and the corner is an intersection point at which any two straight line sides that are not parallel to each other in the image intersect; and a convex polygon image block is detected from the image according to the corner set, where a shape of the convex polygon image block is a preset shape and a similarity between the convex polygon image block and a preset image block exceeds a preset first threshold, In this way, the convex polygon image block is automatically detected from the image.

A person of ordinary skill in the art may understand that all or a part of the steps of the embodiments may be implemented by hardware or a program instructing relevant hardware. The program may be stored in a computer readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A method for detecting a convex polygon image block, wherein the method comprises:

acquiring an image collected by an image sensor;

acquiring a corner set, wherein the corner set comprises a corner in the image, and the corner is an intersection point at which any two straight line sides that are not parallel to each other in the image intersect; and detecting a convex polygon image block from the image according to the corner set, wherein a shape of the convex polygon image block is a preset shape and a similarity between the convex polygon image block and a preset image block exceeds a preset first threshold, wherein the acquiring the corner set comprises:

acquiring a candidate corner set, wherein a candidate corner in the candidate corner set is a pixel, of which a corner response value is greater than a preset second threshold, in the image, a contour point comprised by a contour of a connected component in the image, or an edge point comprised by an edge of an object in the image; and selecting, from the candidate corner set, a candidate corner which is an intersection point where two straight line sides that are not parallel to each other intersect, using the selected candidate corner as a corner, and forming a corner set.

2. The method according to claim 1, wherein the selecting, from the candidate corner set, a candidate corner which is an intersection point where two straight line sides that are not parallel to each other intersect comprises:

using the candidate corner as a center, determining an N×N image area, and acquiring, from the image area, a pixel of which a gradient magnitude is greater than a preset third threshold, wherein N is an odd number greater than or equal to 3;

sorting, according to a size of a horizontal gradient component of each acquired pixel, the acquired pixels to obtain a column of pixels;

acquiring pixel sequences from the column of pixels, wherein an angle between gradient directions of any two neighboring pixels in the pixel sequences is less than a preset angle threshold; and if at least two pixel sequences in which the number of pixels is greater than or equal to a preset first number exist in the acquired pixel sequences, determining the candidate corner as an intersection point at which two straight line sides that are not parallel to each other intersect, and selecting the candidate corner.

3. The method according to claim 2, before the acquiring, from the image area, a pixel of which a gradient magnitude is greater than a preset third threshold, further comprising:

calculating a gradient magnitude and a gradient direction of each pixel according to a gray value of each pixel comprised in the image area.

4. The method according to claim 1, after the using the selected candidate corner as a corner, further comprising:

selecting, from the acquired pixel sequences, two pixel sequences in which the number of pixels is greater than or equal to a preset first number; and separately calculating an average value of gradient directions of pixels comprised in the two selected pixel sequences, and respectively using the two average values obtained by calculation as gradient directions of two straight line sides corresponding to the corner.

5. The method according to claim 4, wherein the detecting a convex polygon image block from the image according to the corner set, wherein a shape of the convex polygon image block is a preset shape and a similarity between the convex polygon image block and a preset image block exceeds a preset first threshold comprises:

acquiring, according to gradient directions of two straight line sides corresponding to each corner in the corner set, a preset second number of corners, wherein the preset second number of corners can form a convex polygon whose shape is the preset shape;

forming, by using the acquired preset second number of corners, the convex polygon whose shape is the preset shape, and acquiring, from the image, a convex polygon image block of the preset shape; and retaining the convex polygon image block of the preset shape if a similarity between the convex polygon image block of the preset shape and the preset image block exceeds the preset first threshold.

6. The method according to claim 1, wherein the detecting a convex polygon image block from the image according to the corner set, wherein a shape of the convex polygon image block is a preset shape and a similarity between the convex polygon image block and a preset image block exceeds a preset first threshold comprises:

acquiring, according to gradient directions of two straight line sides corresponding to each corner in the corner set, a preset second number of corners, wherein the preset second number of corners can form a convex polygon whose shape is the preset shape;

forming, by using the acquired preset second number of corners, the convex polygon whose shape is the preset shape, and acquiring, from the image, a convex polygon image block of the preset shape; and retaining the convex polygon image block of the preset shape if a similarity between the convex polygon image block of the preset shape and the preset image block exceeds the preset first threshold.

7. An apparatus for detecting a convex polygon image block, wherein the apparatus comprises a memory and a processor, the processor is configured to perform a program which is stored in the memory, wherein the program comprises:

a first acquiring module, configured to acquire an image collected by an image sensor;

a second acquiring module, configured to acquire a corner set, wherein the corner set comprises a corner in the image, and the corner is an intersection point at which any two straight line sides that are not parallel to each other in the image intersect; and a detecting module, configured to detect a convex polygon image block from the image according to the corner set, wherein a shape of the convex polygon image block is a preset shape and a similarity between the convex polygon image block and a preset image block exceeds a preset first threshold, wherein the second acquiring module comprises:

a first acquiring unit, configured to acquire a candidate corner set, wherein a candidate corner in the candidate corner set is a pixel, of which a corner response value is greater than a preset second threshold, in the image, a contour point comprised by a contour of a connected component in the image, or an edge point comprised by an edge of an object in the image; and a selecting unit, configured to select, from the candidate corner set, a candidate corner which is an intersection point where two straight line sides that are not parallel to each other intersect, use the selected candidate corner as a corner, and form a corner set.

8. The apparatus according to claim 7, wherein the selecting unit comprises:

a first acquiring subunit, configured to use the candidate corner as a center, determine an N×N image area, and acquire, from the image area, a pixel of which a gradient magnitude is greater than a preset third threshold, wherein N is an odd number greater than or equal to 3;

a sorting subunit, configured to sort, according to a size of a horizontal gradient component of each acquired pixel, the acquired pixels to obtain a column of pixels;

a second acquiring subunit, configured to acquire pixel sequences from the column of pixels, wherein an angle between gradient directions of any two neighboring pixels in the pixel sequences is less than a preset angle threshold; and a determining subunit, configured to, if at least two pixel sequences in which the number of pixels is greater than or equal to a preset first number exist in the acquired pixel sequences, determine the candidate corner as an intersection point at which two straight line sides that are not parallel to each other intersect, and select the candidate corner.

9. The apparatus according to claim 8, wherein the selecting unit further comprises:

a first calculating subunit, configured to calculate a gradient magnitude and a gradient direction of each pixel according to a gray value of each pixel comprised in the image area.

10. The apparatus according to claim 7, wherein the selecting unit further comprises:

a selecting subunit, configured to select, from the acquired pixel sequences, two pixel sequences in which a number of pixels is greater than or equal to the preset first number; and a second calculating subunit, configured to separately calculate an average value of gradient directions of pixels comprised in the two selected pixel sequences, and respectively use the two average values obtained by calculation as gradient directions of two straight line sides corresponding to the corner.

11. The apparatus according to claim 10, wherein the detecting module comprises:

a second acquiring unit, configured to acquire, according to gradient directions of two straight line sides corresponding to each corner in the corner set, a preset second number of corners, wherein the preset second number of corners can form a convex polygon whose shape is the preset shape;

a forming unit, configured to form, by using the preset second number of corners, the convex polygon whose shape is the preset shape, and acquire, from the image, a convex polygon image block of the preset shape; and a retaining unit, configured to retain the convex polygon image block of the preset shape if a similarity between the convex polygon image block of the preset shape and the preset image block exceeds the preset first threshold.

12. The apparatus according to claim 7, wherein the detecting module comprises:

a second acquiring unit, configured to acquire, according to gradient directions of two straight line sides corresponding to each corner in the corner set, a preset second number of corners, wherein the preset second number of corners can form a convex polygon whose shape is the preset shape;

a forming unit, configured to form, by using the preset second number of corners, the convex polygon whose shape is the preset shape, and acquire, from the image, a convex polygon image block of the preset shape; and a retaining unit, configured to retain the convex polygon image block of the preset shape if a similarity between the convex polygon image block of the preset shape and the preset image block exceeds the preset first threshold.

* * * * *